United States Patent
Powell

(10) Patent No.: US 12,085,119 B2
(45) Date of Patent: Sep. 10, 2024

(54) DIRECTIONAL DRILL QUICK ATTACH DEVICE AND METHOD

(71) Applicant: TT Technologies, Inc., Aurora, IL (US)

(72) Inventor: Matthew Powell, Aurora, IL (US)

(73) Assignee: TT Technologies, Inc., Aurora, IL (US)

( * ) Notice: Subject to any disclaimer, the term of this patent is extended or adjusted under 35 U.S.C. 154(b) by 174 days.

(21) Appl. No.: 17/023,609

(22) Filed: Sep. 17, 2020

(65) Prior Publication Data

US 2021/0079939 A1 Mar. 18, 2021

Related U.S. Application Data

(60) Provisional application No. 62/901,462, filed on Sep. 17, 2019.

(51) Int. Cl.
| | |
|---|---|
| *F16B 7/04* | (2006.01) |
| *B60D 1/145* | (2006.01) |
| *B60R 9/06* | (2006.01) |
| *E21B 15/04* | (2006.01) |
| *B60D 1/00* | (2006.01) |

(52) U.S. Cl.
CPC ............ *F16B 7/042* (2013.01); *B60D 1/145* (2013.01); *B60D 2001/001* (2013.01); *E21B 15/04* (2013.01)

(58) Field of Classification Search
CPC ... F16B 7/042; B60D 1/145; B60D 2001/001; E21B 15/04; B60R 9/06
USPC ................................ 224/518–521, 488, 485
See application file for complete search history.

(56) References Cited

U.S. PATENT DOCUMENTS

| | | | | |
|---|---|---|---|---|
| 2,588,068 | A * | 3/1952 | Williams | E21B 10/66 175/122 |
| 4,597,424 | A * | 7/1986 | Levan | B23Q 1/70 144/1.1 |
| 4,646,952 | A * | 3/1987 | Timmers | B60R 9/10 224/500 |
| 4,962,598 | A * | 10/1990 | Woolhiser | E01H 1/056 37/231 |
| 5,033,662 | A * | 7/1991 | Godin | B60R 9/065 296/57.1 |
| 5,215,234 | A * | 6/1993 | Pasley | B60R 9/06 224/508 |
| 5,224,636 | A * | 7/1993 | Bounds | B60R 9/06 224/521 |
| 5,427,289 | A * | 6/1995 | Ostor | B60R 9/06 224/42.32 |
| 5,433,357 | A * | 7/1995 | Alliff | B60R 9/06 224/510 |
| 5,485,690 | A * | 1/1996 | MacQueen | E01H 5/06 172/395 |
| 5,699,985 | A * | 12/1997 | Vogel | B60R 9/06 224/521 |
| 6,502,730 | B2 * | 1/2003 | Johnson | B60R 9/10 224/924 |

(Continued)

*Primary Examiner* — Anne Marie M Boehler
(74) *Attorney, Agent, or Firm* — Schwegman Lundberg & Woessner, P.A.

(57) ABSTRACT

A directional drill and associated methods are disclosed. In one example, the directional drill includes two accessory connection sockets spaced apart on a rear end of the drill frame. In selected examples, the accessory connection sockets including a tool-less connection mechanism for optional securing of an accessory.

6 Claims, 4 Drawing Sheets

(56) References Cited

U.S. PATENT DOCUMENTS

| | | | |
|---|---|---|---|
| 6,659,490 B1* | 12/2003 | Simpson | B62D 53/0828 |
| | | | 280/460.1 |
| 6,742,799 B1* | 6/2004 | Hansen | B60D 1/52 |
| | | | 280/495 |
| 6,948,732 B2* | 9/2005 | Amacker | B60R 9/06 |
| | | | 280/495 |
| 9,096,179 B2* | 8/2015 | Reiseder | B60R 9/06 |
| 9,506,217 B2* | 11/2016 | Shell | A01G 23/062 |
| 9,816,320 B1* | 11/2017 | Herrick | E21B 7/04 |
| 10,919,351 B1* | 2/2021 | Corwin | B60D 1/56 |
| 11,155,132 B2* | 10/2021 | Pack | B62D 63/065 |
| 2004/0217573 A1* | 11/2004 | Foster | B60R 3/005 |
| | | | 280/166 |
| 2006/0151971 A1* | 7/2006 | Buehler | E01F 15/148 |
| | | | 280/446.1 |
| 2010/0038882 A1* | 2/2010 | Chimento | A01B 59/002 |
| | | | 280/490.1 |
| 2016/0002989 A1* | 1/2016 | Lane | E21B 19/165 |
| | | | 175/24 |
| 2016/0305307 A1* | 10/2016 | Shue | F01P 3/18 |
| 2017/0150682 A1* | 6/2017 | Hoppel | A01D 42/08 |

* cited by examiner

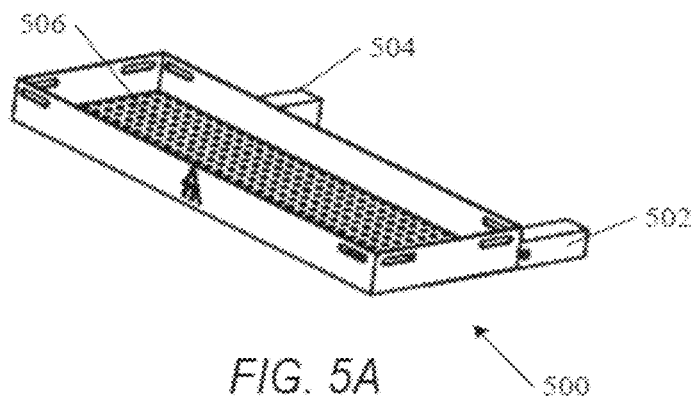
FIG. 5A
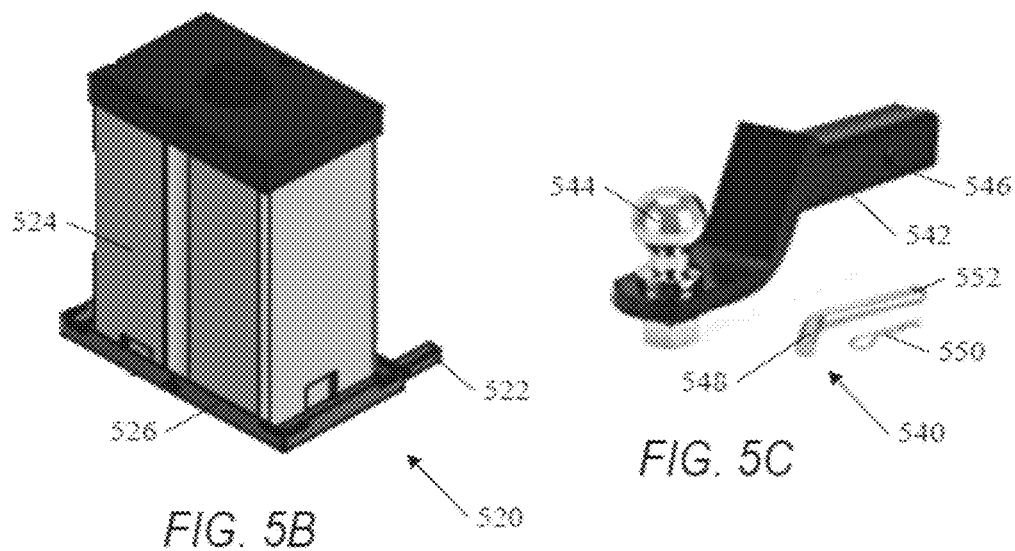
FIG. 5B
FIG. 5C

DIRECTIONAL DRILL QUICK ATTACH DEVICE AND METHOD

CLAIM OF PRIORITY

This patent application claims the benefit of priority, under 35 U.S.C. § 119(e), to U.S. Provisional Patent Application Ser. No. 62/901,462, entitled "DIRECTIONAL DRILL QUICK ATTACH DEVICE AND METHOD," filed on Sep. 17, 2019, which is hereby incorporated by reference herein in its entirety.

TECHNICAL FIELD

Embodiments described herein generally relate directional drills and associated methods.

BACKGROUND

Accessories may be useful with directional drills. However, a different set of accessories may be desired for different jobs. It is desired to have that address these concerns, and other technical challenges.

BRIEF DESCRIPTION OF THE DRAWINGS

FIG. 5A shows an accessory tray for a directional drill in accordance with some example embodiments.

FIG. 5B shows a water container accessory for a directional drill in accordance with some example embodiments.

FIG. 5C shows a receiver hitch for a directional drill in accordance with some example embodiments.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
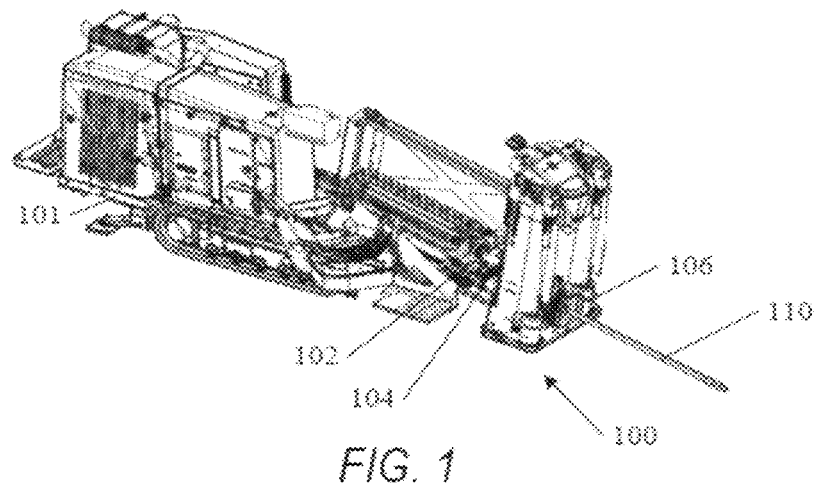
FIG. 1 shows a directional drill in accordance with some example embodiments.

FIG. 1 shows an example of a directional drill 100. The directional drill 100 includes a drive motor 102 mounted on a sliding carriage 104. The sliding carriage 104 is adapted to move back and forth on a drill frame 101. A drill stem vice 106 is shown located at a front end of the drill frame 101. A section of drill stem 110 is shown coupled to the drive motor 102, and passing through the drill stem vice 106.

Figure 2:
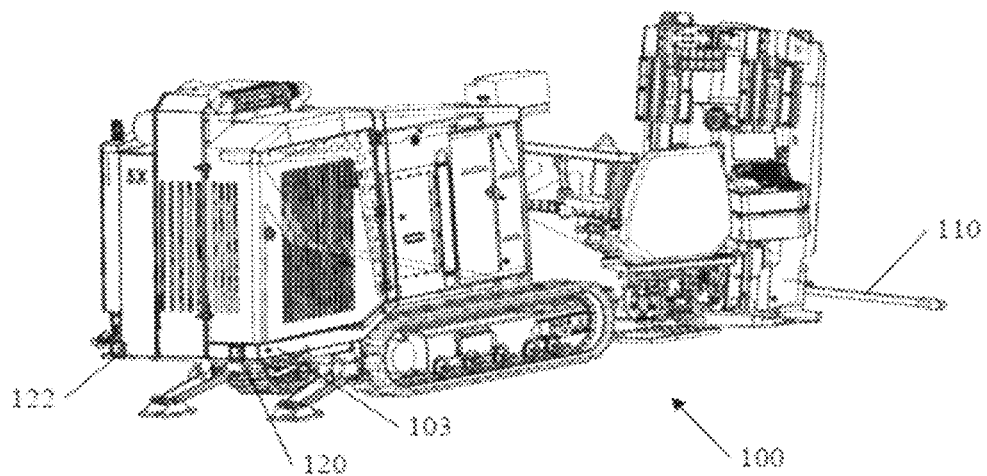
FIG. 2 shows a rear view of a directional drill in accordance with some example embodiments.

FIG. 2 shows a rear view of the directional drill 100 from FIG. 1. A first accessory connection socket 120 and a second accessory connection socket 122 are shown, spaced apart on a rear end 103 of the drill frame 101. In one example, the accessory connection sockets 120, 122 include a tool-less connection mechanism for optional securing of an accessory. Examples of accessories are shown and discussed below.

Although two accessory connection sockets are discussed as an example, other numbers of accessory connection sockets are within the scope of the invention. One advantage of more than one accessory connection socket is that heavy accessories can be more securely mounted to the directional drill 100. Additionally, two accessory connection sockets, spaced apart reduce side to side wobble of a heavy accessory, such as a water tank.

Examples of tool-less connection mechanisms include, but are not limited to, a pin passed through a hole in both the socket and a male connecting portion of the accessory. Another example of a tool-less connection mechanism includes a locking hitch pin with a key. Another example of a tool-less connection mechanism includes a spring pin that stays mounted to a side of the accessory connection socket and is movable against a spring into and out of a hole that passes through the socket and a male connecting portion of the accessory. Another example of a tool-less connection mechanism includes a latch with a lever that secures a male connecting portion of the accessory to the socket. Another example of a tool-less connection mechanism includes a wing nut or wing bolt that may be operated using fingers.

Although tool-less connection mechanisms are described, other connection mechanisms may be used that require tools. For example, a threaded bolt may be used, where a wrench, such as an allen wrench or box end wrench is used to secure the connection mechanism. In one example, multiple connection mechanisms may be used. For example, a hitch pin may be used with select accessories, such as a receiver hitch described in more detail below. When other accessories are used, for example, a water tank, a different connection mechanism, for example, a threaded bold may be used.

Advantages of tool-less connection include, but are not limited to, ease of use and fewer tools to keep track of. Advantages of tooled connection mechanisms include, but are not limited to, security against theft and more stable connections.

Figure 3:
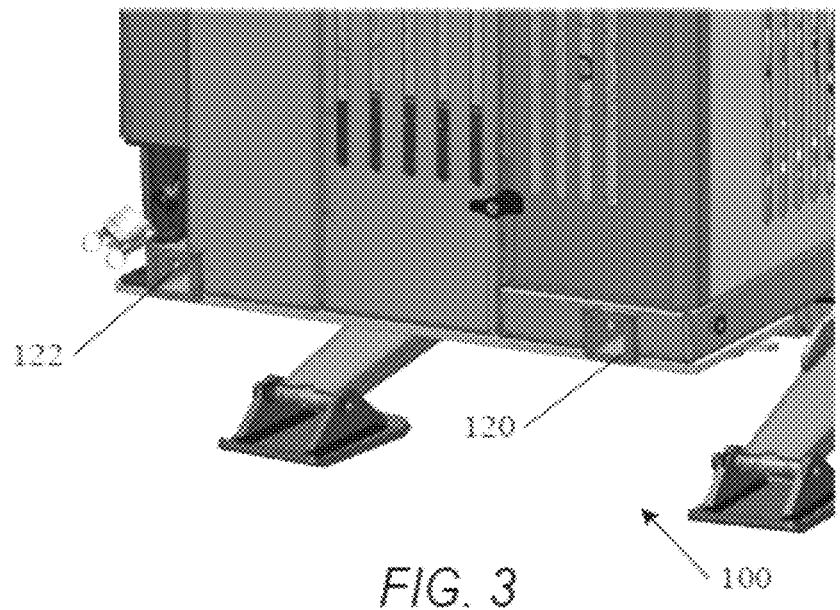
FIG. 3 shows a close up rear view of a directional drill in accordance with some example embodiments.
Figure 4:
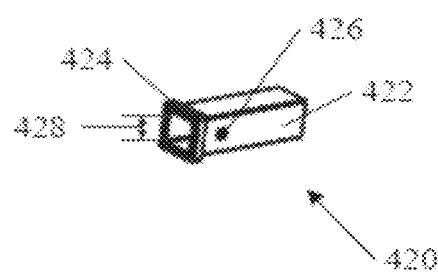
FIG. 4 shows an isometric view of an accessory connection socket in accordance with some example embodiments.

FIG. 3 shows close up detail of the accessory connection sockets 120, 122. FIG. 4 shows a single accessory connection socket 420 that may be used for accessory connection socket 120 or 122. The accessory connection socket 420 includes a tube 422 and a reinforced lip 424. A hole 426 is shown in a side of the tube 422 and may be used as a connection mechanism as described above. In one example the accessory connection socket 420 is adapted to work with industry standard receiver hitches. In one example the accessory connection socket 420 is a square socket. In one example, an inner dimension 428 of a square socket is 2 inches. Other example inner dimensions 428 include, but are not limited to 1¼ inch, 2½ inch, and 3 inch.

FIG. 5A shows an accessory tray 500 adapted to mount to two accessory connection sockets spaced apart on a rear end of a drill frame as shown in Figures above. The accessory tray 500 includes a first projection 502 and a second projection 504 coupled to a tray 506. In one example, the projections 502, 504 are square. In one example, the projections 502, 504 are 2 inches on each side of the square. Other sizes are also within the scope of the invention, to correspond to different possible dimensions of accessory connection sockets as discussed above. One example use of accessory tray 500 includes carrying a heavy toolbox along with the directional drill 100 as a job progresses along a length of a run.

FIG. 5B shows a water tank accessory 520 according to one example. The water tank accessory 520 includes a first projection 522 and a second projection (not shown) coupled to a tray 526. A water tank 524 is shown attached to the tray 526. In one example, a drill fluid tank may optionally be attached to the tray 526. Examples of drill fluid include, but are not limited to, bentonite. In one example, the projections 522, 524 are 2 inches on each side of the square. Other sizes are also within the scope of the invention, to correspond to different possible dimensions of accessory connection sockets as discussed above.

FIG. 5C shows a receiver hitch 540 for use in examples of the invention. The receiver hitch 540 includes a shank 542 and a ball 544. A hole 546 is included in a side of the shank 542 to secure the receiver hitch 540 into one of the accessory connection sockets. A hitch pin 552 and a cotter pin 550 are shown as example tool-less connections that may be used to secure the receiver hitch 540 into one of the accessory connection sockets. As discussed above, more than one connection mechanism may be used with a given system. For example, a hitch pin 552 may be used with a receiver hitch, while a different connection mechanism such as a bolt or other pin may be used to secure other accessories such as the accessory tray 500 or water tank accessory 520. In other examples a single connection mechanism such as a hitch pin 552 may be used to secure all accessories.

The use of tool-less connection mechanisms allows a user to switch between accessories such as the accessory tray 500, the water tank accessory 520, and the receiver hitch 540. The use of two or more accessory connection sockets provides stability and security for heavy accessories such as tool boxes or large water tanks/drill fluid tanks.

Figure 6:
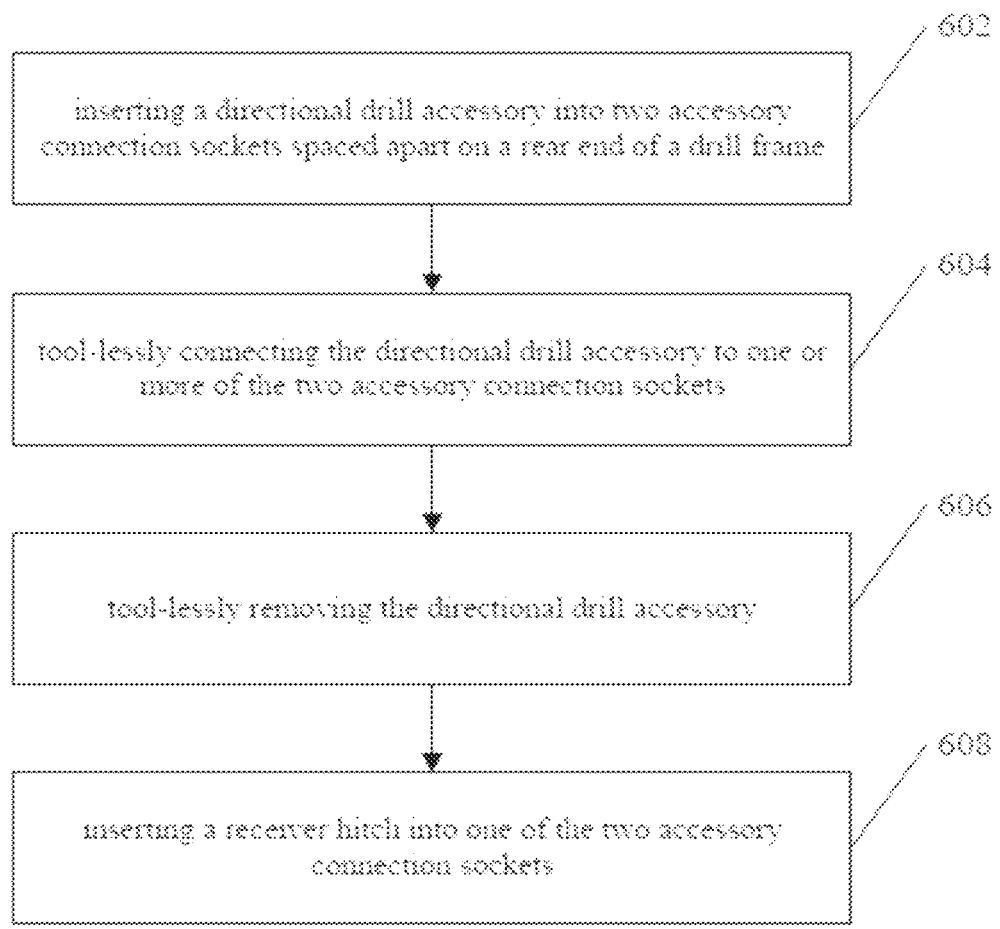
FIG. 6 shows a flow diagram of a method of operating a directional drill in accordance with some example embodiments.

FIG. 6 shows one example method of operating a directional drill. In operation 602, a directional drill accessory is inserted into two accessory connection sockets spaced apart on a rear end of a drill frame. In operation 604, the directional drill accessory is tool-lessly connected to one or more of the two accessory connection sockets. In operation 606, the directional drill accessory is tool-lessly removed, and in operation 608, a receiver hitch is inserted into one of the two accessory connection sockets.

One advantage of being able to insert a receiver hitch into one of the two accessory connection sockets includes the ability of the directional drill to pull its own trailer along at a job site. Typically, a directional drill will be transported to a job site on a trailer, using a pickup truck or similar vehicle. Using example configurations described in the present disclosure, once on the ground and in operation, the pickup truck is not needed to move the trailer over short distances. The directional drill may be instead used to move the trailer.

To better illustrate the method and apparatuses disclosed herein, a non-limiting list of embodiments is provided here:

Example 1 includes a directional drill. The directional drill includes a drive motor mounted on a sliding carriage, the sliding carriage adapted to move back and forth on a drill frame, a drill stem vice located at a front end of the drill frame, and two accessory connection sockets spaced apart on a rear end of the drill frame, the accessory connection sockets including a tool-less connection mechanism for optional securing of an accessory.

Example 2 includes the directional drill of example 1, wherein the two accessory connection sockets include two square sockets.

Example 3 includes the directional drill of any one of examples 1-2, wherein the two square sockets include two square sockets wherein each square socket has an inside dimension of two inches per side.

Example 4 includes the directional drill of any one of examples 1-3, wherein the tool-less connection mechanism includes a hole in a side of each accessory connection socket to accept a pin.

Example 5 includes the directional drill of any one of examples 1-4, further including an accessory tray having a pair of projections that mate with the two accessory connection sockets.

Example 6 includes the directional drill of any one of examples 1-5, further including a water tank having a pair of projections that mate with the two accessory connection sockets.

Example 7 is a method of operating a directional drill. The method includes inserting a directional drill accessory into two accessory connection sockets spaced apart on a rear end of a drill frame, tool-lessly connecting the directional drill accessory to one or more of the two accessory connection sockets, tool-lessly removing the directional drill accessory, and inserting a receiver hitch into one of the two accessory connection sockets.

Example 8 includes the method of example 7, wherein tool-lessly connecting the directional drill accessory includes inserting a pin through a side hole in the one or more of the two accessory connection sockets.

Example 9 includes the method of any one of examples 7-8, wherein tool-lessly connecting the directional drill accessory includes tool-lessly connecting a tray.

Example 10 includes the method of any one of examples 7-9, wherein tool-lessly connecting the directional drill accessory includes tool-lessly connecting a water container.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A directional drill, comprising:
   a drive motor mounted on a sliding carriage, the sliding carriage adapted to move back and forth on a drill frame;
   a drill stem vice located at a front end of the drill frame;
   two horizontal accessory connection sockets spaced apart on a rear end of the drill frame, the accessory connection sockets including a tool-less connection mechanism for optional securing of an accessory; and
   a water tank accessory having a pair of projections that mate with the two accessory connection sockets.

2. The directional drill of claim 1, wherein the two accessory connection sockets include two square sockets.

3. The directional drill of claim 2, wherein the two square sockets include two square sockets wherein each square socket has an inside dimension of two inches per side.

4. The directional drill of claim 1, wherein the tool-less connection mechanism includes a hole in a side of each accessory connection socket to accept a pin.

5. A method of operating a directional drill, comprising:
   inserting a water container accessory into two horizontal accessory connection sockets spaced apart on opposing lateral sides of a rear end of a drill frame;
   tool-lessly connecting the water container accessory to one or more of the two accessory connection sockets;
   tool-lessly disconnecting the water container accessory from the one or more of the two accessory connection sockets and removing the water container accessory; and
   inserting a receiver hitch into one of the two accessory connection sockets.

6. The method of claim 5, wherein tool-lessly connecting the directional drill accessory includes inserting a pin through a side hole in the one or more of the two accessory connection sockets.

* * * * *